United States Patent [19]

Leorat

[11] Patent Number: 5,058,015
[45] Date of Patent: Oct. 15, 1991

[54] PROCESS OF MODULATION CONTROL OF THE TORQUE OF A HEAT ENGINE ASSOCIATED WITH AN AUTOMATIC TRANSMISSION

[75] Inventor: Francois Leorat, Versailles, France

[73] Assignee: Regie Nationale des Usines Renault, Boulogne-Billancourt, France

[21] Appl. No.: 395,523

[22] Filed: Aug. 18, 1989

[30] Foreign Application Priority Data

Aug. 18, 1988 [FR] France ............... 88 10980

[51] Int. Cl.$^5$ ........................... B60K 41/10
[52] U.S. Cl. .................... 364/424.1; 74/866
[58] Field of Search ............ 366/424.1; 123/432; 60/611, 612; 74/866, 867, 868

[56] References Cited

U.S. PATENT DOCUMENTS

| | | | |
|---|---|---|---|
| 3,834,499 | 9/1974 | Candellero et al. | 192/0.09 |
| 4,266,447 | 5/1981 | Heess et al. | 74/866 |
| 4,403,527 | 9/1983 | Mohl et al. | 74/866 |
| 4,512,307 | 4/1985 | Igashira et al. | 123/198 DB |
| 4,691,285 | 9/1987 | Takeda | 364/424.1 |
| 4,727,719 | 3/1988 | Mizutani | 123/432 |
| 4,744,031 | 5/1988 | Takeda et al. | 364/424.1 |
| 4,933,851 | 6/1990 | Ito et al. | 364/424.1 |

FOREIGN PATENT DOCUMENTS

| | | |
|---|---|---|
| 355070 | 2/1990 | European Pat. Off. . |
| 3507126 | 8/1985 | Fed. Rep. of Germany . |

*Primary Examiner*—Salvatore Cangialosi
*Attorney, Agent, or Firm*—Oblon, Spivak, McClelland, Maier & Neustadt

[57] ABSTRACT

The modulation the control of a heat engine associated with an automatic transmission having an electronic control unit includes the steps of initiating a shift of the automatic transmission by the electronic control unit and substantially simultaneously with shifting, delivering a torque modulation signal to an engine torque control element of the engine for reducing engine torque during shifting.

1 Claim, 5 Drawing Sheets

PROCESS OF MODULATION CONTROL OF THE TORQUE OF A HEAT ENGINE ASSOCIATED WITH AN AUTOMATIC TRANSMISSION

BACKGROUND OF THE INVENTION

1. Field of the Invention

This invention relates to a process of modulation control of the torque of a heat engine which is associated with an automatic transmission, particularly for passenger motor vehicles.

2. Background of the Related Art

A problem which exists in the control of automatic transmissions arises in the quality of the shifting of the gears. Smooth shifts at normal engine torque require long shift times. It is thus necessary to make a compromise between the reduction of the shifting time of these gears and the shifting comfort.

SUMMARY OF THE INVENTION

Accordingly, one object of this invention is to provide a novel process of modulation control of the torque of a heat engine associated with an automatic transmission so as to reduce the shifting time with constant comfort or so as to improve comfort without increasing the shifting time.

According to an embodiment of the invention, the above object is achieved by providing a process of modulation control of the torque of a heat engine associated with an automatic transmission, wherein an electronic control for the automatic transmission acts also and simultaneously on a control element of the engine by means of a unidirectional and single-wire link, to produce a signal for modulation of the torque.

The signal is an all-or-nothing, time-modulated signal acting on the engine torque during the shifting of the gears.

According to an embodiment of the invention, the control element of the engine which receives the signal for modulation of the torque coming from the electronic control unit of the automatic transmission is the ignition unit of the controlled ignition engine.

According to a further embodiment of the invention, the control element of the engine which receives the signal for modulation of the torque coming from the electronic control unit of the automatic transmission is the control unit of the electronic diesel fuel injection pump.

According to yet a further embodiment of the invention, the control element of the engine, of the turbocharged diesel type, which receives the signal for modulation of the torque coming from the electronic control unit of the automatic transmission, is a three way pneumatic solenoid valve which makes the working chamber of the fuel injection pump communicate with the a discharge at atmospheric pressure when the modulation signal excites said solenoid valve.

This invention thus exhibits the advantage of offering an improvement in controlling automatic transmissions by means of a unidirectional, single-wire link by an all-or-nothing signal that is simply time-modulated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The process of modulation control of the torque of a heat engine according to the invention is associated with an automatic transmission managed by an electronic control unit. This electronic control unit acts on a control element of the engine by means of a unidirectional and single-wire link by an all-or-nothing, time width-modulated signal to act on the engine torque during the shifting of the gears.

For the controlled ignition engine, the ignition unit is the control element which receives the signal for modulation of the engine torque from the electronic control unit of the automatic transmission.

Figure 7:
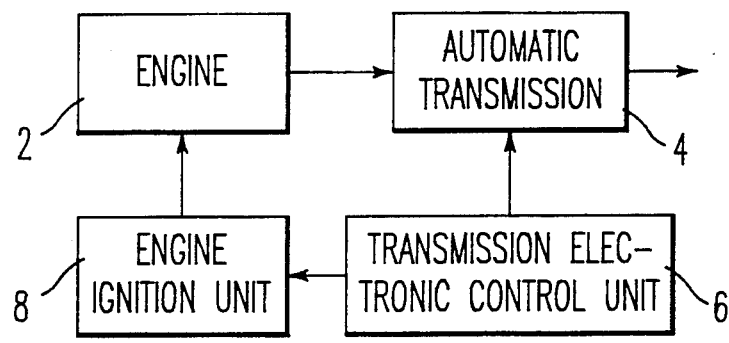
FIG. 7 schematically shows the control flow of the invention as applied to a controlled ignition engine.

Referring to FIG. 7, the drive output from a conventional engine 2 is delivered to the wheels via a conventional automatic transmission 4. The automatic transmission 4 may be controlled by a conventional transmission electronic control unit 6. According to the invention, the transmission electronic control unit 6 delivers a signal to a conventional engine ignition unit 8.

The signal from the electronic control unit 6 can take any form capable of controlling the engine ignition unit 8 to reduce the engine torque during shifting of the automatic transmission 4 and is preferably an all-or-nothing (on/off) signal of a controlled duration.

Figure 10:
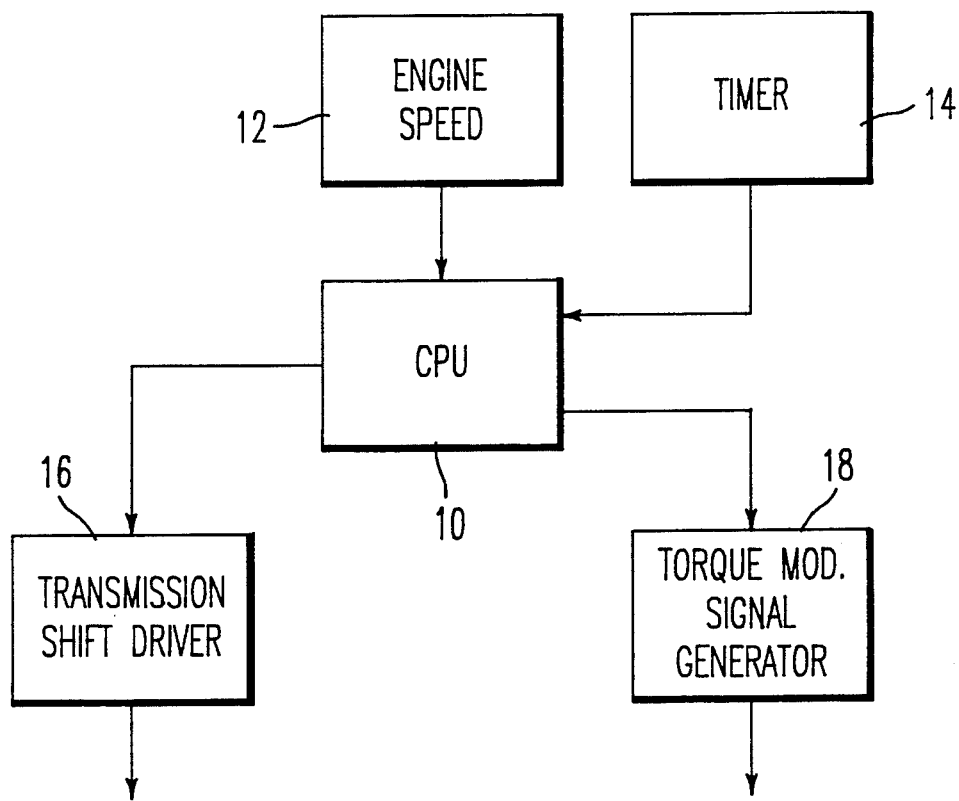
FIG. 10 schematically shows one possible form of the transmission electronic control unit.

One possible form of the transmission electronic control unit is shown in FIG. 10. There, a CPU 10, which may be a conventional microprocessor programmed to shift the transmission 4 according to a predetermined program, receives engine speed signals from the engine speed detector 12 and time signals from the timer 14. The CPU 10 controls a transmission shift driver 16 according to the conventional shift program. The CPU 10 also controls a torque modification signal generator 18 which generates signals of the desired duration to the engine ignition unit 8.

The engine ignition unit 8 can reduce the engine torque in any known manner, for example by retarding the spark ignition timing.

For a diesel engine having an electronic diesel fuel injection pump, the control unit of said pump is the control element which receives the signal for modulation of the engine torque from the electronic control unit of the automatic transmission.

Figure 8:
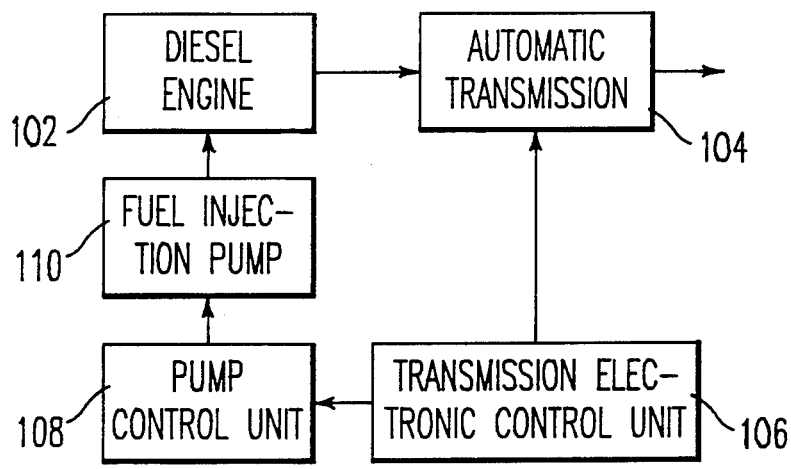
FIG. 8 schematically shows the control flow of the invention as applied to a diesel engine.

In this second embodiment (FIG. 8), the drive output from a diesel engine 102 is delivered to the wheels via a conventional automatic transmission 104 controlled by a transmission electronic control unit 106, which may be conventional, and which may correspond to that shown in FIG. 10. In this embodiment, a diesel engine fuel injection pump 110 is controlled by a conventional pump control unit 108, for example an electronic pump driver which varies the pump pressure or the duration of fuel injection into the diesel engine 102 during each combustion cycle of the engine. The transmission electronic control unit modulation signal can be an on/off signal that operates on the pump control unit to reduce the engine torque during shifting in any known manner, for example by reducing the pump pressure or the fuel delivery duration.

In the case of the turbocharged diesel engine, a 3-way pneumatic solenoid valve is the control element which receives the signal for modulation of the engine torque from the electronic control unit of the automatic transmission. This solenoid valve makes the working chamber of the fuel injection pump communicate with a reservoir at atmospheric pressure when the modulation signal excites said solenoid valve.

Figure 9:
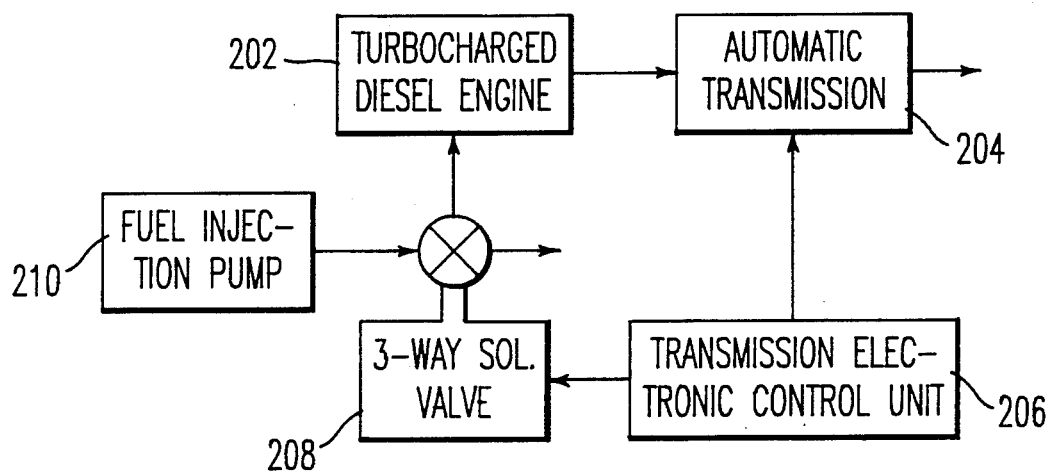
FIG. 9 schematically shows the control flow of the invention as applied to a turbocharged diesel engine.

This third embodiment is schematically shown in FIG. 9. The torque from a conventional turbocharged diesel engine 202 is delivered through the wheels via a conventional automatic transmission 204. The automatic transmission 204 can be controlled by a conventional transmission electronic control unit 206, for example of the type shown in FIG. 10. Fuel is delivered to the engine 202 from a fuel injection pump 210 via a three way solenoid valve 208. The valve 208 is capable of delivering fuel either to the engine 202 or to a reservoir at atmospheric pressure, based upon the excitation of the solenoid of the valve 208. The solenoid is selectively activated by the transmission electronic control unit 206 during shifting to return a controlled proportion of the fuel from the fuel injection pump 208 to the reservoir for reducing the engine torque.

Figure 1:
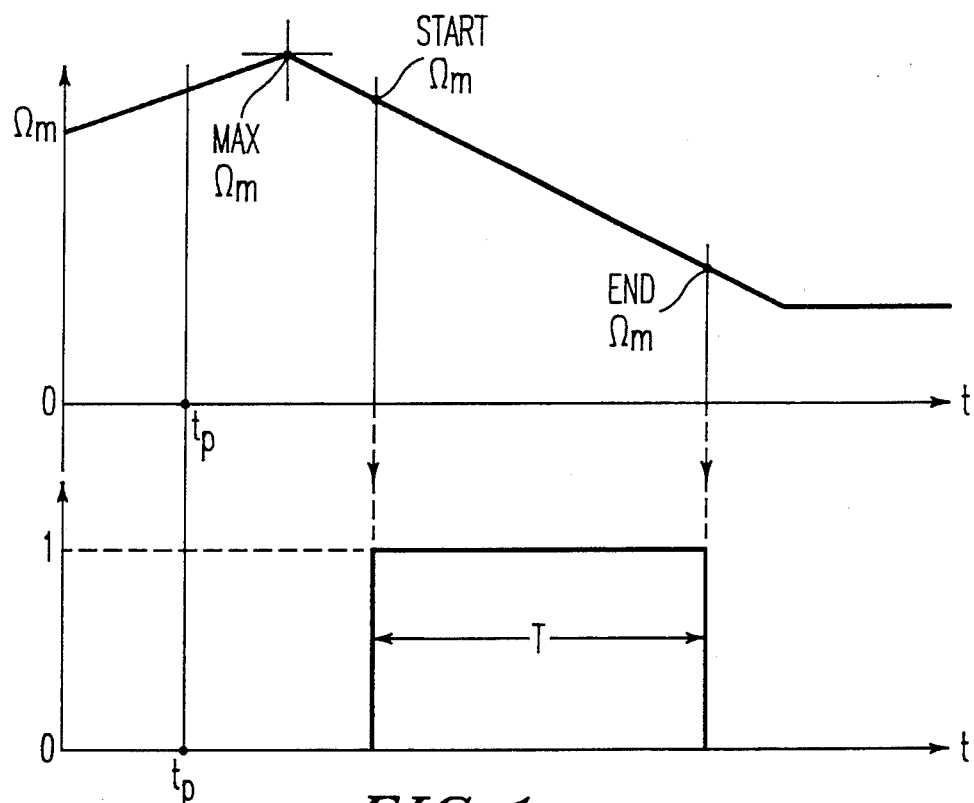
FIG. 1 is a graph showing both the modulation signal and the engine speed as a function of time.

For upshifting from a gear N to a gear N+1, of all engine types, the torque modulation signal is a single signal having a time duration T as shown in FIG. 1. This time T follows the moment tp of initiation of the shift and is between a minimum time $T_{threshold}$ and a maximum time $T_{max}$. The initiation and termination of T are determined by the engine speed information $\Omega_m$ so that:

$$\Omega_m^{start} = k_1 \cdot \Omega_m^{max}$$

$$\Omega_m^{end} = k_2 \cdot \Omega_m^{max}$$

where $k_1$ and $k_2$ are predetermined constants such that $k_2$ is smaller than $k_1$ and where $\Omega_m^{max}$ represents the maximum value reached by engine speed in the first moments of the shifting from gear N to gear N+1.

For downshifting from a gear N to a gear N-1 or N-2 of the controlled ignition engine and of the electronic diesel fuel injection pump engine, the modulation signal is a dual signal (FIG. 2) with each of the dual signals having a duration equal to a threshold time $T_{threshold}$.

The start of the first signal occurs at the end of a time $T_1$ in relation to the start tp of the shifting from gear N to gear N-1 or N-2, and the end of the first signal is separated from the start of the second signal a time $T_2$ such that:

$$T_1 = f_1 \text{ (shifting N/(N-i), } \Omega_m\text{)}$$

$$T_2 = f_2 \text{ (shifting N/(N-i), } \Omega_m\text{)}$$

where $f_1$ and $f_2$ are functions 1 and 2, and $i = 1, 2$.

Figure 2:
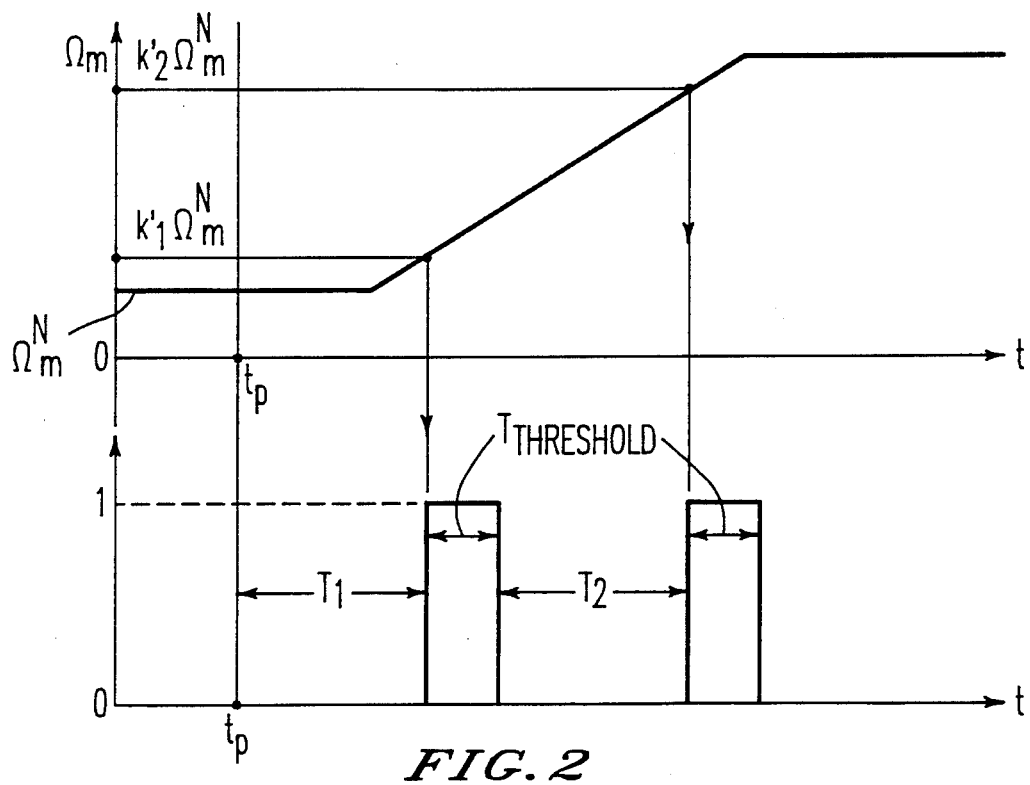
FIG. 2 corresponds to FIG. 1 but shows a second embodiment.

In another embodiment, T1 and T2 are determined by:

$$\Omega_m^{start} = k'_1 \cdot \Omega_m^N$$

$$\Omega_m^{end} = k'_2 \cdot \Omega_m^N$$

where $k'_1$ and $k'_2$ are predetermined constants, $\Omega_m^N$ being the engine speed just at the start tp of the shifting, as is represented in FIG. 2.

Figure 3:
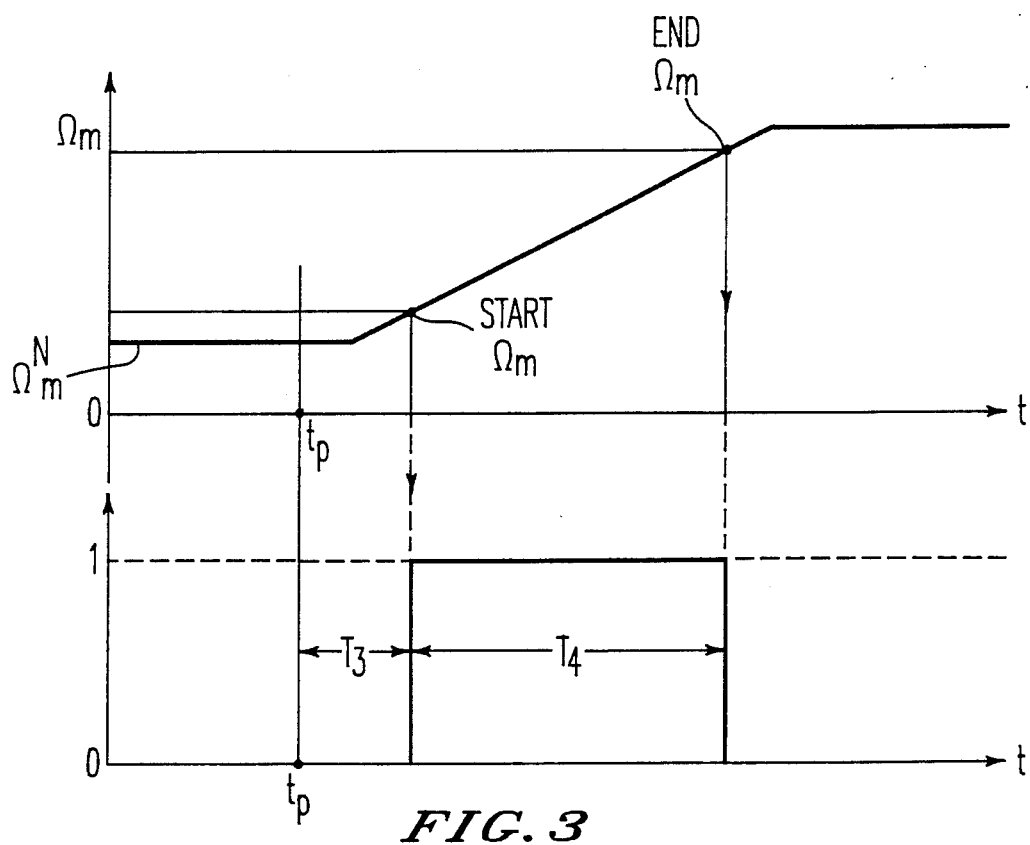
FIG. 3 corresponds to FIG. 1 but shows a third embodiment.

In the case of the turbocharged diesel engine and for downshiftings from gear N to gear N-1 or N-2, the modulation signal is a single signal with a time $T_4$ (FIG. 3). The start of the signal occurs at the end of a time $T_3$ in relation to the start tp of the shifting from gear N to gear N-1 or N-2, $T_3$ and $T_4$ being respectively determined by the moments where:

$$\Omega_m^{start} = k_3 \cdot \Omega_m^N$$

$$\Omega_m^{end} = k_4 \cdot \Omega_m^N$$

with $1 \leq k_3 \leq k_4$, where $k_3$ and $k_4$ are constants,
$\Omega_m^N$ being the engine speed at the start tp of the shifting.

Figure 4:
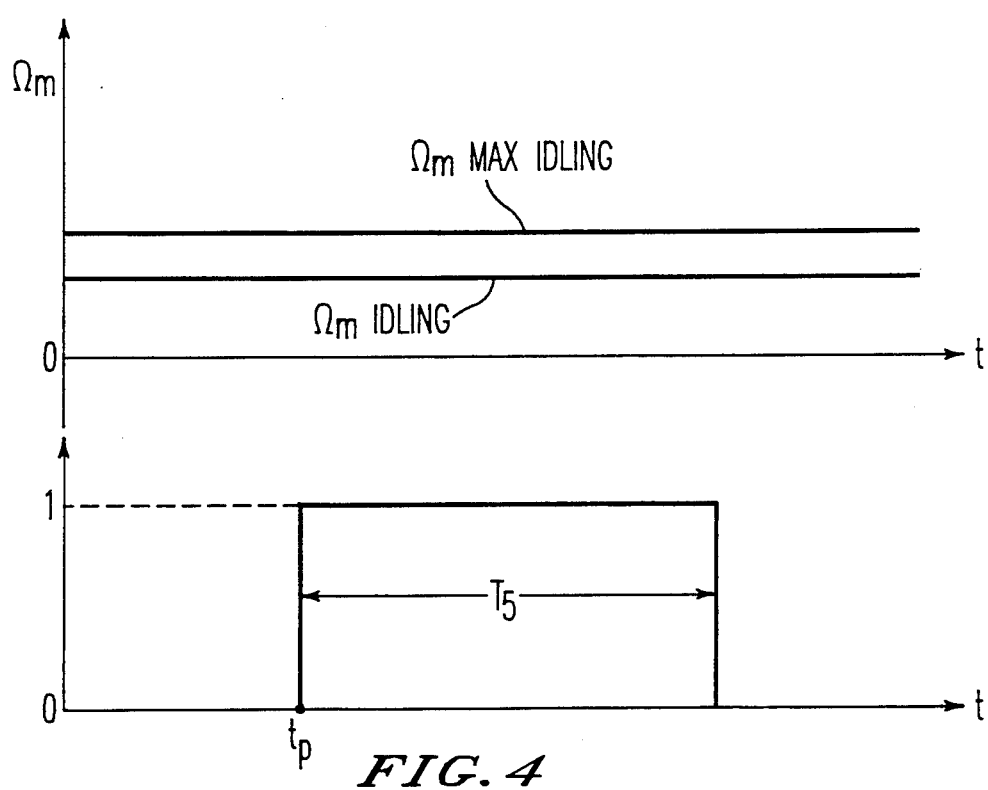
FIG. 4 corresponds to FIG. 1 but shows a fourth embodiment.

For the "Neutral" and "Parking" positions of the automatic transmission (FIG. 4), the engine torque should also be reduced when shifting into a drive gear. In the case of the controlled ignition engine and the electronic diesel engine, the modulation signal is a single signal of a time $T_5$ which is greater than a maximum time $T_{max}$, provided that the engine speed $\Omega_m$ at idling is less than the maximum idling engine speed $\Omega_m$ max idling, and provided that the opening degree $\alpha_c$ of the fuel supply (e.g., the carburetor in a carbureted gasoline engine) is less than a threshold value $\alpha_c^{threshold}$, i.e.:

$$T_5 > T_{max}$$

$$\Omega m < \Omega m^{max\ idling}$$

$$\alpha c < \alpha c^{threshold}$$

Figure 5:
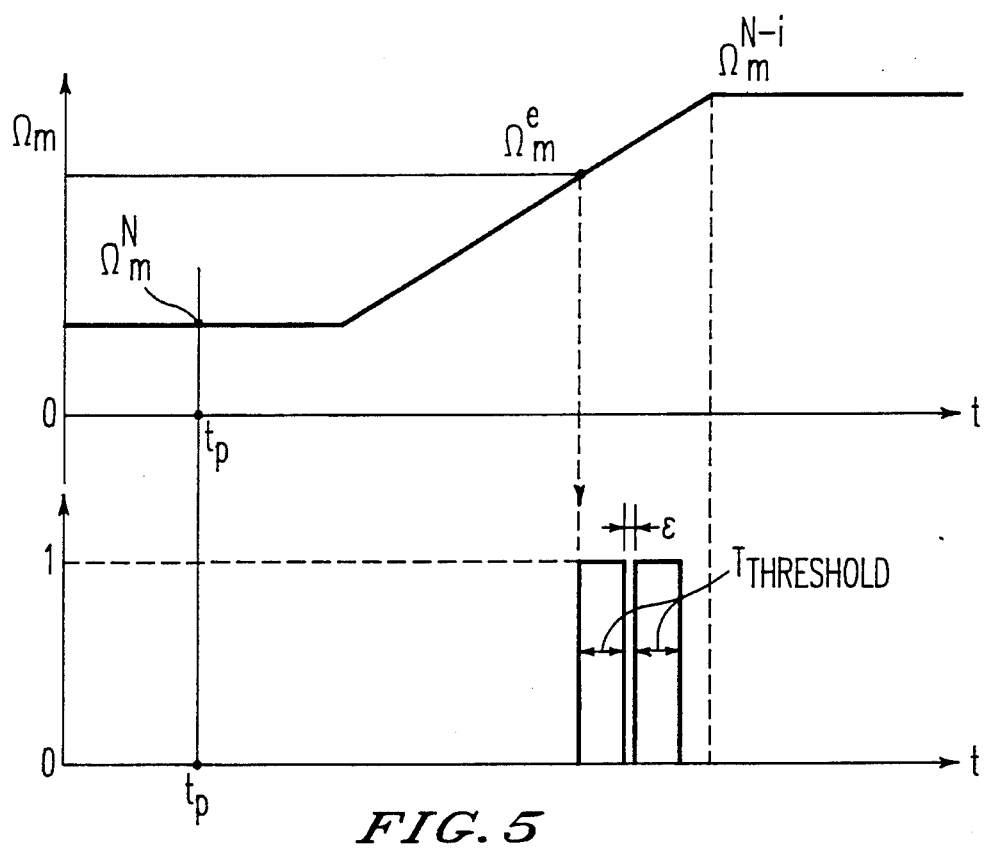
FIG. 5 corresponds to FIG. 1 but shows a fifth embodiment.

A variant of the invention, for all types of engines and for the downshiftings from gear N to gear N-i, (where i = 1,2) is characterized by a modulation signal which is a dual signal with each of the signal times equal to a threshold time $T_{threshold}$ (see FIG. 5).

The two signals are separated by a constant time $\epsilon$, the modulation signal being triggered when the engine speed $\Omega_m$ is equal to a value $\Omega_m^e$ defined by the relation:

$$\Omega_m^e = k_5 \cdot \Omega_{vh}^N$$

where $\Omega_{vh}^N$ speed of the vehicle in gear N just before shifting, $k_5$ being a suitable constant.

Figure 6:
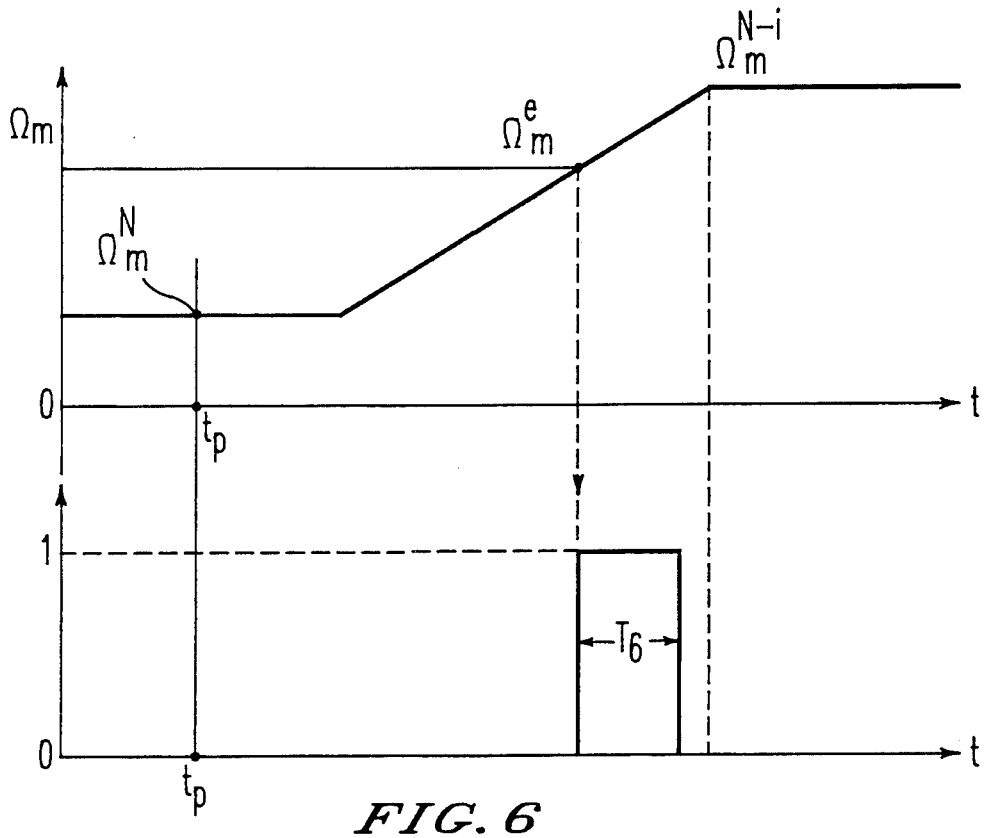
FIG. 6 corresponds to FIG. 1 but shows a sixth embodiment.

A variant of the invention for the turbocharged diesel engine and for downshifting from gear N to gear N-1 or N-2, is characterized by a modulation signal which is a single signal of suitable constant time $T_6$ (see FIG. 6).

The modulation signal of time $T_6$ is triggered when the engine speed $\Omega_m$ is equal to a value $\Omega_m^e$ defined by the relation:

$$\Omega_m^e = k_6 \cdot \Omega_{Vh}^N$$

where $\Omega_{Vh}^N$ speed of the vehicle in gear N just before shifting, $k_6$ being a suitable constant.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process of modulation control of a heat engine associated with an automatic transmission having an electronic control unit, comprising the steps of:

initiating a gear shift of said automatic transmission by said electronic control unit, wherein said gear shift is one of an upshift and a downshift; and immediately after said step of initiating a gear shift, delivering a torque modulation signal to an engine torque control means of the heat engine for reducing engine torque during said shift, wherein said signal is an on-off, time modulated, signal, and wherein, for downshifting from a gear N to a gear N-i, where i = 1,2, the modulation signal is a dual signal with each of the two dual signals having a duration equal to a threshold time $T_{threshold}$, the two signals being separated by a constant time $\epsilon$, the modulation signal being triggered when the engine speed $\Omega_m$ is equal to a value $\Omega_m^e$; $\Omega_m^e$ being defined by the relation:

$$\Omega_m^e = k_5 \cdot \Omega_{Vh}^N$$

where:
$\Omega_{Vh}^N$ is the speed of the vehicle in gear N at the beginning of shifting, and
$k_5$ is a constant.

* * * * *